United States Patent [19]

Yanidis

[11] Patent Number: 4,853,290

[45] Date of Patent: Aug. 1, 1989

[54] POLYPROPYLENE LAMINATE HAVING AN EMA-EAA TIE LAYER

[75] Inventor: Apostol Yanidis, Berkeley, Calif.

[73] Assignee: James River II, Inc., Oakland, Calif.

[21] Appl. No.: 202,077

[22] Filed: Jun. 3, 1988

[51] Int. Cl.⁴ ............................................. B32B 27/08
[52] U.S. Cl. .................................... 428/516; 428/522; 428/520; 428/35.2; 428/35.7; 525/221
[58] Field of Search ................ 525/221; 428/522, 520, 428/35, 516

[56] References Cited

U.S. PATENT DOCUMENTS 4,188,441 2/1980 Cook ..................................... 428/520
4,386,124 5/1983 Akao ..................................... 428/35

*Primary Examiner*—George F. Lesmes
*Assistant Examiner*—A. Harbin
*Attorney, Agent, or Firm*—Stanley M. Teigland

[57] ABSTRACT

The bond strength of ethylene-methyl acrylate copolymer to polypropylene is improved synergistically by blending between about 10 and 50 percent ethylene-acrylic acid copolymer with the ethylene-methyl acrylate copolymer.

5 Claims, No Drawings

POLYPROPYLENE LAMINATE HAVING AN EMA-EAA TIE LAYER

This invention relates to laminates of polypropylene film prepared by coextruding a polymer composition onto the polypropylene film. The coextruded composition comprises (a) a tie layer adjacent the polypropylene layer and (b) a functional polymer layer on the other side of the tie layer. The functional polymer layer typically provides strength and barrier properties. The coextruded composition may contain other layers, such as an outer heatseal layer. The laminates are useful for packaging various articles, particularly food.

This invention provides an improved tie layer. The tie layer comprises a blend of from about 50 to about 90 percent, perferably 60 to 80 percent, by weight of (a) a copolymer of ethylene and methyl acrylate or ethyl acrylate and (b) from about 10 to about 50 percent, preferably 20 to 40 percent, by weight of a copolymer of ethylene and acrylic acid or methacrylic acid. The alkyl acrylate content of the first copolymer is preferably between about 8 and 28 percent by weight. The carboxylic acid content of the second copolymer is perferably between about 3 and about 25 percent by weight. The alkyl acrylate is preferably methyl acrylate. The carboxylic acid is perferably acrylic acid. The blend may contain minor amounts, perferably less than ten percent, of other components.

The tie layer of this invention adhers to polypropylene better than tie layers consisting of only one of the two copolymers. Hence, using the two copolymers together provides a synergistic effect. The tie layer of this invention also adhers well to ink printed on the surface of the polypropylene film.

The polypropylene film is preferably oriented.

The functional polymer layer may be any polymer which has a bond strength with the tie layer which is at least as good as the bond strength between the tie layer and the polypropylene. The functional polymer layer is preferably a polyolefin.

COMPARATIVE EXAMPLE A

A polymer composition was coextruded at a tempreature of 550° F. onto a biaxially oriented polypropylene film that had been printed and corona treated after having been printed. The thickness of the film was 0.75 mil. The coextruded composition consisted of a tie layer, a functional layer, and a heatseal layer. The tie layer consisted of 100 percent ethylene-methyl acrylate copolymer having a methyl acrylate content of 20 percent. The functional layer consisted of 80 percent high density polyethylene and 20 percent of a blend of white pigment in a low density polyethylene matrix. The heatseal layer consisted of 94 percent of a blend of ionomers (Surlyn 1652SB and Surlyn 1605) and 6 percent of a blend of brown pigment in a low density polyethylene matrix. The basis weights of the tie layer, functional layer and heatseal layer were 5, 21, and 5 pounds/ream, respectively. The thickness of the laminate was 2.9 mils. The strength of the bond between the tie layer and the unprinted areas of the polypropylene film was between 500 and 600 grams per inch.

COMPARATIVE EXAMPLE B

Example A was repeated except the tie layer consisted of 100 percent ethylene-acrylic acid copolymer having an acrylic acid content of 9 percent. The strength of the bond between the tie layer and the unprinted areas of the polypropylene film was between 40 and 80 grams per inch.

EXAMPLE 1

Example A was repeated except the tie layer consisted of 70 percent of the copolymer employed in Example A and 30 percent of the copolymer employed in Example B. The strength of the bond between the tie layer and the unprinted areas of the polypropylene film was 950 grams per inch. The strength of the bond between the tie layer and the printed areas of the film was comparable to that observed in Examples A and B (300 to 400 grams/inch). This Example demonstrates that the bond strength to oriented polypropylene provided by the tie layer of this invention is greater than that provided by a tie layer consisting of only one of the two copolymers in the blend forming the tie layer of the invention. It is especially surprising that ethylene-acrylic acid copolymer, which has poor bond strength to oriented polypropylene, would improve the bond strength of ethylene-methyl acrylate copolymer.

I claim:

1. In a laminate comprising a layer of polypropylene and a layer of a polymer composition coextruded onto the polypropylene layer, the polymer composition comprising (a) a tie layer adjacent the polypropylene layer and (b) a functional polymer layer on the other side of the tie layer, the improvement wherein the tie layer comprises a blend of (a) from about 50 to 90 percent by weight of a copolymer of ethylene and methyl acrylate or ethyl acrylate and (b) from about 10 to about 50 percent of a copolymer of ethylene and acrylic acid or methacrylic acid.

2. The improvement of claim 1 wherein the tie layer comprises a blend of a copolymer of ethylene and methyl acrylate and a copolymer of ethylene and acrylic acid.

3. The improvement of claim 2 wherein the blend comprises from about 60 to 80 percent of the copolymer of ethylene and methyl acrylate and from about 20 to 40 percent of the copolymer of ethylene and acrylic acid.

4. The improvement of claim 3 wherein the polypropylene is oriented.

5. The improvement of claim 4 wherein the functional polymer layer is a layer of polyolefin.

* * * * *